US012748861B1

(12) United States Patent
Majumdar

(10) Patent No.: US 12,748,861 B1
(45) Date of Patent: Sep. 29, 2026

(54) METHOD AND SYSTEM FOR CODE SECURITY EVALUATION AND RULE GENERATION USING GRAPH-BASED ANALYSIS

(71) Applicant: Intuit Inc., Mountain View, CA (US)

(72) Inventor: Anamitra Dutta Majumdar, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/373,390

(22) Filed: Oct. 29, 2025

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC ......................... G06F 21/577; G06F 2221/033
See application file for complete search history.

(56) References Cited

U.S. PATENT DOCUMENTS

| | | | | |
|---|---|---|---|---|
| 11,288,061 | B1 * | 3/2022 | Johnson | G06F 8/51 |
| 11,321,226 | B2 * | 5/2022 | Felisatti | G06F 40/20 |
| 11,556,444 | B1 * | 1/2023 | Rohithakshappa | G06F 11/3404 |
| 11,657,161 | B2 * | 5/2023 | Hendrickx | H04L 63/1433 726/25 |
| 11,775,291 | B2 * | 10/2023 | Wagner | G06F 8/71 717/168 |
| 12,164,646 | B2 * | 12/2024 | Siman | G06F 21/577 |
| 12,348,545 | B1 * | 7/2025 | Parikh | G06F 9/455 |
| 12,489,770 | B1 * | 12/2025 | Fechner | G06F 9/455 |
| 2020/0042712 | A1 * | 2/2020 | Foo | G06F 21/577 |
| 2021/0182391 | A1 * | 6/2021 | Plate | G06N 20/00 |
| 2022/0210200 | A1 * | 6/2022 | Crabtree | G06F 16/951 |
| 2022/0345480 | A1 * | 10/2022 | Shua | G06F 21/577 |
| 2024/0385823 | A1 * | 11/2024 | Hoole | G06F 8/65 |
| 2024/0419794 | A1 * | 12/2024 | Murthy | G06F 21/577 |

(Continued)

OTHER PUBLICATIONS

Kavian et al., "LLM Security Guard for Code" Proceedings of the 28th International Conference on Evaluation and Assessment in Software Engineering, ACM, pp. 600-660; URL: https://arxiv.org/pdf/2405.01103 (Jun. 18, 2024).

(Continued)

*Primary Examiner* — Viral S Lakhia
(74) *Attorney, Agent, or Firm* — Dinsmore & Shohl LLP

(57) ABSTRACT

Aspects of the disclosure relate to evaluating source code repositories to generate secure coding rules. An application implemented by a computer system receives a list of repositories for multiple software agents, performs code analysis using threat modeling techniques to identify flaws, and generates evaluation reports. Data from the reports is stored in a graph database as nodes representing repositories, flaws, reports, and contextual information, with portions optionally converted into vector embeddings. The graph database is aggregated to identify flaws recurring across repositories. Based on these aggregated results, the application generates secure coding rules, which are provided to downstream systems. The downstream systems may apply the secure coding rules to influence generation of software code or configuration of agent blueprints, thereby enabling consistent remediation and improved software security across codebases.

20 Claims, 8 Drawing Sheets

(56) References Cited

U.S. PATENT DOCUMENTS

| | | | | |
|---|---|---|---|---|
| 2025/0165637 | A1* | 5/2025 | Sheridan | G06F 21/577 |
| 2025/0291896 | A1* | 9/2025 | Lang, Sr. | G06F 21/54 |
| 2025/0378177 | A1* | 12/2025 | Conikee | G06F 21/577 |

OTHER PUBLICATIONS https://www.backslash.security/ (Sep. 20, 2025).

* cited by examiner

METHOD AND SYSTEM FOR CODE SECURITY EVALUATION AND RULE GENERATION USING GRAPH-BASED ANALYSIS

BACKGROUND

Field

Aspects of the present disclosure relate to computer security systems, and in particular, to code analysis and rule generation using graph-based evaluation techniques.

Description of Related Art

Modern software applications are often built from large numbers of code repositories and microservices, which are updated and deployed continuously in enterprise environments. As codebases grow in size and complexity, the task of ensuring that source code adheres to secure coding and design standards and frameworks has become increasingly difficult. To address this, organizations may employ automated tools for code analysis. Such tools can include static code analysis platforms, vulnerability scanners, and threat modeling frameworks that attempt to identify security flaws within source code before deployment. These approaches may provide reports of detected issues or vulnerabilities, which developers can use to remediate security flaws in code.

Some systems also incorporate threat modeling frameworks that define common attack surfaces and security risks for software systems. These frameworks can be applied during design or implementation phases to help identify potential security flaws. In enterprise environments, reports generated by such tools may be reviewed across multiple projects to identify recurring issues.

Despite these efforts, challenges remain in managing the large volume of evaluation data produced across multiple repositories and services. Existing tools often operate in silos, with results stored in unstructured formats that are difficult to aggregate or correlate. This can make it difficult to detect common flaw patterns or to systematically translate analysis results into actionable guidance for developers.

SUMMARY

Certain aspects provide a method for providing secure coding rules. The method includes receiving, at an application implemented by a computer system, a list of code repositories for a plurality of software agents; for each code repository in the list: performing, by the application, a code analysis of the code repository using one or more threat modeling techniques to identify one or more flaws; generating, by the application, an evaluation report based on the one or more flaws; and storing, by the application, data from the evaluation report in a graph database as a plurality of nodes, wherein the plurality of nodes represent the code repository, the evaluation report, and contextual information associated with the code repository, and wherein storing comprises converting at least a portion of the evaluation report into vector embeddings; aggregating, by the application, the plurality of nodes in the graph database to identify one or more flaws that are present in more than one of the code repositories in the list; generating, by the application, one or more secure coding rules based on the one or more flaws; and providing, by the application, the one or more secure coding rules to a downstream system, wherein the downstream system applies the one or more secure coding rules to influence generation of software code or to influence configuration of agent blueprints.

Certain aspects provide a method for outputting secure coding rules. The method includes accessing, by a computer-implemented application, evaluation data associated with a plurality of code repositories, the evaluation data comprising flaws identified by applying one or more threat modeling techniques to source code of the plurality of code repositories; storing, by the application, the evaluation data in a graph database as nodes representing the code repositories, the flaws, and contextual information describing the code repositories; aggregating, by the application, the nodes in the graph database to detect recurring flaw patterns across the plurality of code repositories; normalizing, by the application, the recurring flaw patterns into common flaw entries; generating, by the application, one or more secure coding rules based on the recurring flaw patterns and the common flaw entries; and outputting, by the application, the one or more secure coding rules to a downstream system configured to enforce the one or more secure coding rules during development, deployment, or automated generation of software code.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
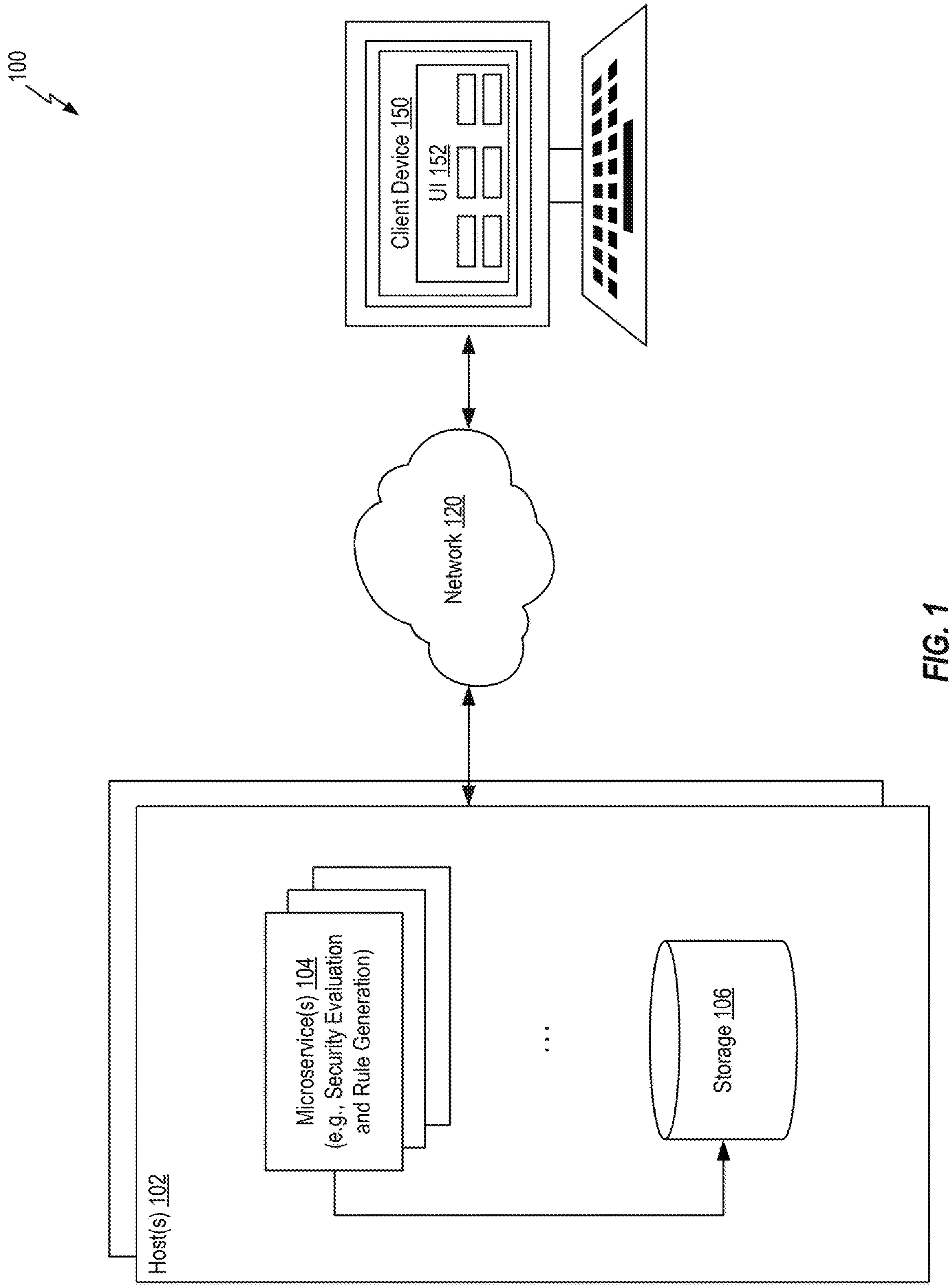
FIG. 1 is a schematic system diagram illustrating an example processing system supporting microservices interconnected via a network.

Aspects of the present disclosure provide apparatuses, methods, processing systems, and computer-readable mediums for evaluating source code repositories to identify security flaws and generate secure coding rules. The techniques described herein involve receiving a list of code repositories associated with multiple software agents, performing code analysis using one or more threat modeling techniques to identify flaws, and generating evaluation reports (e.g., flaw mitigation reports) that capture the identified flaws. Data from the evaluation reports is stored in a graph database as nodes representing the analyzed repository, the evaluation report, and contextual information such as associated architecture diagrams. The graph database may be aggregated to identify flaws that occur across multiple repositories. Based on these aggregated results, the system generates secure coding rules, which may then be provided to a downstream system for influencing the generation of software code or the configuration of agent blueprints.

In some environments, automated security tools are integrated into systems that evaluate source code repositories to identify potential flaws or vulnerabilities. To enhance the accuracy and consistency of such evaluations, systems may apply threat modeling frameworks (e.g., specific to AI agents) that define potential attack vectors, security risks, or architectural weaknesses. These evaluations may generate reports that describe flaws for individual repositories, which may be used by developers to guide remediation efforts. In some aspects, code analysis in this context involves scanning repositories according to pre-defined security models or heuristics, and outputting lists of detected issues together with supporting context. By relying on such frameworks, existing systems may improve the ability of organizations to identify flaws during development across a wide variety of codebases.

While existing code analysis and threat modeling tools can help identify flaws within individual repositories, they can also introduce challenges related to evaluation and accuracy at scale. In some cases, the reports generated by such tools are siloed and lack a consistent structure, making it difficult to aggregate results across multiple repositories or services. By way of example, a flaw identified in one microservice may also appear in several others, but without a unified representation, recurring issues may not be detected or prioritized. In some environments, the same flaw may be described differently depending on the tool or framework used, leading to inconsistent terminology or duplicated entries. These limitations create operational inefficiencies for organizations maintaining large numbers of microservices or distributed systems. Developers may be forced to manually review multiple reports to identify recurring flaws, resulting in duplication of effort and inconsistent remediation strategies. Furthermore, human reviewers may encounter difficulty in identifying recurring flaws, particularly due to differing descriptions of flaws and the cumulative nature of the reports. In other cases, security teams may lack visibility into common flaw patterns, leading to delayed detection of systemic vulnerabilities. Because traditional tools typically operate on a repository-by-repository basis, organizations may lack automated mechanisms to correlate results, detect recurring flaw patterns, or translate findings into actionable guidance that can be applied across multiple projects. Moreover, existing approaches may lack the ability to automatically generate machine-readable remediation artifacts, such as secure coding rules, starter-kit patches, and/or prompt modifications, thereby leaving remediation to manual developer interpretation and increasing the risk of inconsistent fixes.

Embodiments described herein address these technical problems by enabling a system that evaluates source code repositories, stores evaluation results in a graph-based representation, and derives secure coding rules from aggregated findings. In operation, the system may analyze multiple repositories associated with different software agents, applying one or more threat modeling techniques to identify potential flaws. For each repository, the system may generate a report that records the detected issues and related context, which may then be represented in the graph database as interconnected nodes. The nodes may capture information such as the repository being analyzed, the evaluation report, detected flaws, and supporting artifacts like architecture diagrams, and in some cases, portions of the evaluation report may be converted into vector embeddings to enable search and correlation capabilities. In some embodiments, by structuring results in this way, the graph database allows flaws to be correlated across repositories (for example, based on edges of the graph database), so that issues appearing in more than one repository can be surfaced as common patterns. From these aggregated results, the system may generate secure coding rules that provide actionable guidance to downstream tools, such as frameworks for automated code generation or systems that configure agent blueprints.

The disclosed techniques provide several technical solutions and advantages. By unifying evaluation results into a graph-based representation, the system enables correlation of analysis outputs from multiple repositories, making it possible to identify recurring flaw patterns that might otherwise remain hidden. In some embodiments, this structured and connected format improves consistency and reduces duplication across large-scale code evaluations. Furthermore, by automatically generating secure coding rules from aggregated results, the system can deliver remediation guidance directly in machine-readable forms (e.g., structured formats, starter-kit patches, or prompt modifications for language models). Unlike prior approaches that leave remediation guidance in unstructured reports, these artifacts may be applied programmatically, such that fixes are consistent across development environments. Over time, iterative refinement of rules may enable organizations to address vulnerabilities proactively, improving scalability, consistency, and the actionable value of code security evaluation.

The graph database is particularly suitable for aspects described herein because it efficiently models complex relationships among diverse entities such as repositories, evaluation reports, detected flaws, and supporting artifacts. This structure enables the system to correlate flaws across multiple repositories, surface recurring vulnerability patterns, and aggregate context-rich findings for targeted remediation. The graph database's ability to incorporate vector embeddings supports advanced semantic search and clustering, while its schema-less design allows for flexible integration of heterogeneous data types like architecture diagrams and contextual metadata. These technical advantages facilitate the generation of actionable secure coding rules that can be automatically propagated to downstream tools, thereby enhancing the security posture of agentic codebases.

Example Microservice System Architecture

FIG. 1 depicts an example system 100 supporting a plurality of microservices 104 (e.g., software-defined services, which in some cases, may be cloud-native). As shown in FIG. 1, system 100 includes client devices 150(1)-(2) (collectively referred to herein as "client devices 150") and hosts 102(1)-(2) (collectively referred to herein as "hosts 102") interconnected through a network 120. Network 120 may be, for example, a direct link, a local area network (LAN), a wide area network (WAN), such as the Internet, another type of network, or a combination of one or more of these networks.

Host 102 may be geographically co-located servers on the same rack or on different racks in any arbitrary location in a data center. Host 102 may be constructed on a server grade hardware platform and include components of a computing device such as, one or more processors (central processing units (CPUs)), one or more memories (random access memory (RAM)), one or more network interfaces (e.g., physical network interfaces (PNICs)), storage 106, and other components (e.g., only storage 106 is shown in FIG. 1).

A first host 102(1) in system 100 may host a plurality of microservices 104(1)-(X) (collectively referred to herein as "microservices 104"), where X is an integer greater than one. For instance, one microservice may perform security evaluation of code repositories to identify flaws using threat modeling techniques, while another may generate secure coding rules based on aggregated flaw patterns across repositories. The microservices 104 may be deployed using virtual machines (VMs) and/or container(s) running on first host 102(1) (e.g., where first host 102(1) is running a hypervisor (not shown) used to abstract processor, memory, storage, and networking resources of first host 102(1)'s hardware platform). Generally, microservices 104 are loosely coupled and independently deployable services (or software) that may make up an application. Microservices 104 may enable segmented, granular level functionalities within a larger system infrastructure.

Client device 150(1) and client device 150(2) may each include a user interface (UI) 152(1), 152(2), respectively, which may be used to communicate with, at least, a first microservice 104(1) and/or another microservice 104, through the X-th microservice 104(X) using the network 120. For example, communication between client devices 150 and a microservice 104 may be facilitated by one or more application programming interfaces (APIs). Examples of client devices 150 may include, but are not limited to, a smartphone, a personal computer, a tablet, a laptop computer, and/or other devices.

As shown in FIG. 1, in certain aspects, a first microservice 104(1) implements an application service operable to evaluate source code repositories and generate corresponding security evaluation reports. For instance, the first microservice 104(1) may receive a list of repositories, perform code analysis using one or more threat modeling techniques, and identify flaws or vulnerabilities in the code. A second microservice 104(2) may implement aggregation functionality to correlate evaluation results across multiple repositories and store data in a graph database (e.g., storage 106). These aggregated results may include repository information, identified flaws, contextual artifacts such as architecture diagrams, and other metadata. In some cases, a third microservice 104(3) may be configured to generate secure coding rules based on recurring flaw patterns identified in the aggregated results and provide these rules to downstream systems for use in software development or agent configuration. One or more of microservices 104 may further support rule synthesis functions, such as formatting secure coding rules by programming language, producing starter-kit patches, or generating prompt modifications for code generation frameworks. A host 102 that implements a microservice 104, or the microservice itself, may be referred to as an apparatus.

Though FIG. 1 depicts each of first host 102(1), storage 106, client device 150(1), and client device 150(2) as single devices for ease of illustration, first host 102(1), storage 106, client device 150(1), and/or client device 150(2) may be embodied in different forms for different implementations. Further, though FIG. 1 depicts only two hosts 102 and two client devices 150, other examples may include more or fewer hosts 102 and/or client devices 150, and client devices 150 may use any combination of microservices 104 on any host 102 where microservices 104 are deployed.

Example Security Evaluation and Rule Generation System

Figure 2:
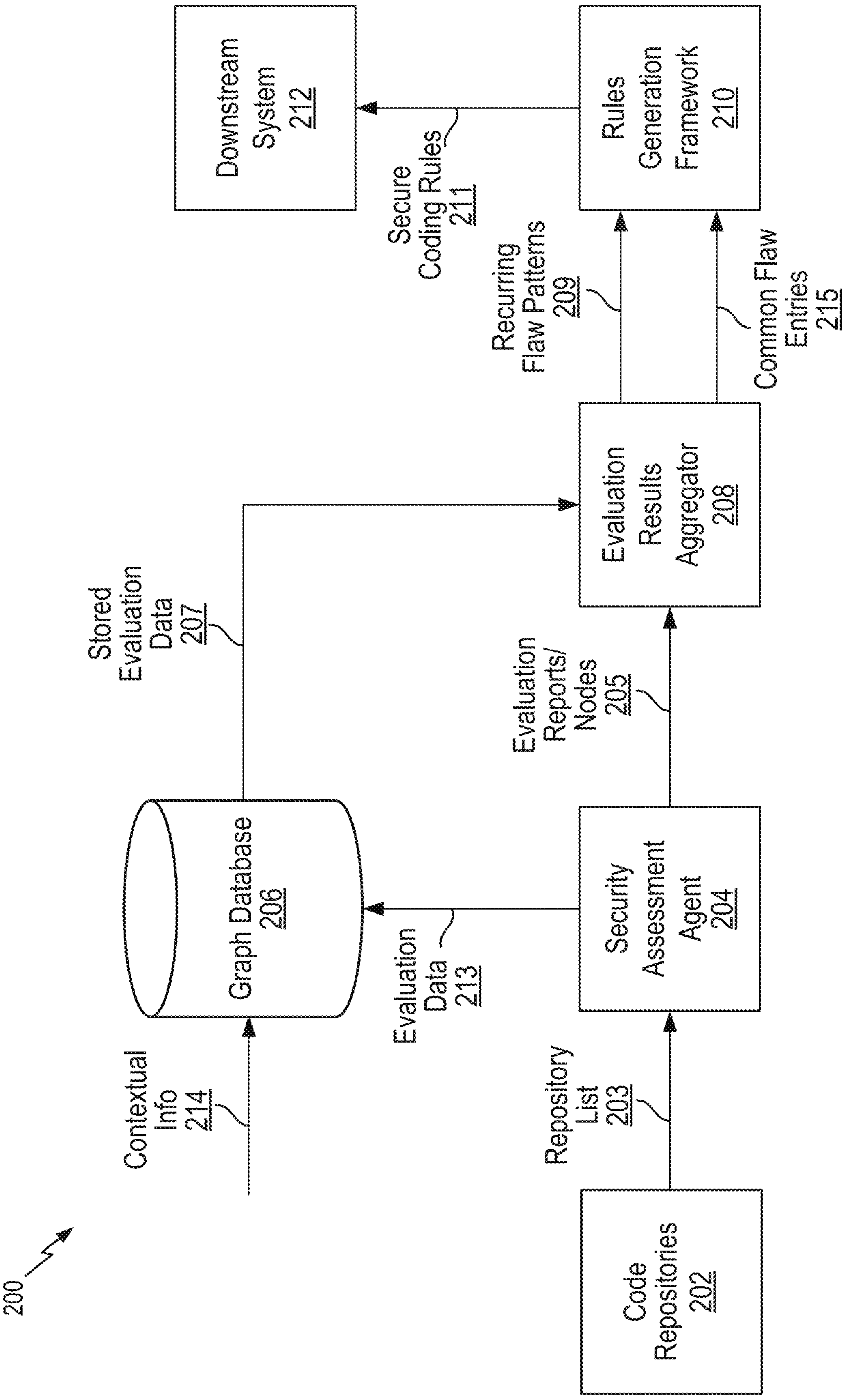
FIG. 2 depicts an example security evaluation and rule generation system.

FIG. 2 depicts one embodiment of an example security evaluation and rule generation system 200. System 200 is a computing system configured to perform security analysis of source code repositories, represent identified flaws in a graph database, and generate secure coding rules based on aggregated evaluation results. As depicted, system 200 includes code repositories 202 that provide repository list 203 to security assessment agent 204. Security assessment agent 204 performs code analysis using one or more threat modeling techniques and produces evaluation reports/nodes 205. These evaluation reports/nodes 205 can be stored as evaluation data 213 in graph database 206, along with contextual information 214 such as architecture diagrams. Stored evaluation data 207 may be retrieved and provided to evaluation results aggregator 208, which aggregates results across repositories to identify recurring flaw patterns 209 and common flaw entries 215. Rules generation framework 210 uses these aggregated outputs to generate secure coding rules 211, which are then provided to downstream system 212 for influencing code generation, starter-kit templates, deployment blueprints, or other configuration workflows. System 200 may be implemented at one or more microservices 104, a host 102, a client device 150, or the like.

In some aspects, code repositories 202 provide repository list 203 to security assessment agent 204. The repository list 203 may identify a set of repositories. Security assessment agent 204 may retrieve source code for each listed repository and perform code analysis using one or more threat modeling techniques to identify flaws. The analysis may apply structured frameworks, such as the Multi Agent Environment Security Threat Risk and Outcome (MAESTRO) framework, to reason about agent goals, assets, trust boundaries, and potential attack paths within the repository. For each repository, security assessment agent 204 generates evaluation reports 205 that describe detected issues, supporting evidence, and/or proposed code improvements. An evaluation report 205 may be or correspond to a node, as described elsewhere herein. Examples of detected issues may include, but are not limited to, unsafe tool invocation by an agent, insecure prompt handling, missing authentication checks in an agent workflow, or exposure of secrets in configuration files. In some aspects, evaluation reports/nodes 205 are stored as evaluation data 213 (e.g., nodes) in graph database 206. Graph database 206 may also receive contextual information 214 associated with the repository, such as an architecture diagram or service metadata, so that relationships between code components and detected flaws are preserved for later analysis. This contextual information 214 may also be represented in the graph database 206.

In one example, security assessment agent 204 processes a list of five repositories that implement separate agents for data ingestion, document parsing, task routing, payment handling, and audit logging. For the payment handling repository (represented by a repository node), security assessment agent 204 may identify a missing authorization check before tool execution and record this as a flaw node linked (for example, by edges of graph database 206) to the repository node and to a report node for that scan. The architecture diagram for the payment flow is ingested as contextual information 214 and linked to the same repository node, enabling downstream correlation between the diagram's payment step and the authorization flaw. Stored evaluation data 207 can be retrieved from graph database 206 by evaluation results aggregator 208, which then operates across repositories to identify recurring flaw patterns 209 and common flaw entries 215. As described later with reference to FIG. 4 and FIG. 5, these aggregated outputs are provided to rules generation framework 210 to produce secure coding rules 211 for downstream system 212.

In some aspects, evaluation results aggregator 208 operates as an intermediate layer between individual repository assessments and the downstream generation of secure coding rules 211. Upon receiving evaluation reports/nodes 205 from security assessment agent 204 and stored evaluation data 207 from graph database 206, evaluation results aggregator 208 can perform correlation, normalization, and consolidation of identified flaws. In some implementations, evaluation results aggregator 208 may detect instances where the same flaw has been identified across multiple repositories but described with different terminology or structures. For example, one repository may reference "missing authentication," while another describes "absent user identity validation." The evaluation results aggregator 208 can normalize these into a common flaw entry 215 so that the issue is consistently represented across the system. By consolidating disparate outputs into a unified format, evaluation results aggregator 208 can enable downstream modules to work with coherent, de-duplicated flaw representations.

In addition to normalization, evaluation results aggregator 208 may apply statistical or graph-based analysis to detect recurring flaw patterns 209 across repositories. For example, evaluation results aggregator 208 may identify that multiple repositories exhibit flaws involving improper use of external APIs or that several microservices consistently fail to sanitize inputs before invoking language model calls. By representing these recurring flaws as higher-order patterns, system 200 can highlight systemic vulnerabilities that may not be apparent from isolated repository reports. These recurring flaw patterns 209, together with common flaw entries 215, are passed to the rules generation framework 210. In this way, evaluation results aggregator 208 bridges the raw outputs of code analysis with structured, reusable artifacts that can be translated into enforceable secure coding rules 211.

In some cases, rules generation framework 210 consumes recurring flaw patterns 209 and common flaw entries 215 produced by evaluation results aggregator 208. In some embodiments, rules generation framework 210 may include submodules such as a flaw database consult module, a rule synthesis engine, and a structured format generator, which can be used to transform aggregated flaw information into actionable secure coding rules 211. These rules may specify patterns of unsafe coding practices and their corresponding remedies, templates for secure implementations, or language-specific guidance that can be applied during the development or code generation process. For instance, when recurring flaw patterns 209 indicate repeated use of unsanitized string concatenation for constructing database queries, rules generation framework 210 may generate a rule recommending the use of parameterized queries or an equivalent secure database access pattern. Secure coding rules 211 may also be prioritized according to frequency, severity, or impact of the underlying flaw pattern, ensuring that the most impactful vulnerabilities are addressed first.

In certain implementations, rules generation framework 210 may produce different categories of secure coding rules 211 depending on the type of downstream system 212 that consumes them. By way of example, when downstream system 212 is a code generation framework, secure coding rules 211 may take the form of starter-kit templates or prompt modifications that influence the generation of secure source code. In another case, when downstream system 212 is a development management tool, secure coding rules 211 may be delivered as structured advisories or configuration policies that can be enforced during code review or build pipelines. The structured format generator within rules generation framework 210 may output secure coding rules 211 in machine-readable formats (e.g., JavaScript Object Notation (JSON) objects or YAML Ain't Markup Language (YAML) documents) to enable compatibility with automated tooling. In some cases, multiple formats of the same secure coding rule may be generated to support heterogeneous downstream systems.

In some aspects, downstream system 212 may be any application or framework configured to enforce, apply, or integrate secure coding rules 211 produced by rules generation framework 210. For instance, downstream system 212 may include an integrated development environment (IDE) that provides developers with real-time feedback and warnings as they write code, automatically highlighting insecure constructs and suggesting secure alternatives. In another example, downstream system 212 may include a blueprint management system that governs the deployment and orchestration of software agents, where secure coding rules 211 are applied to influence how agent blueprints (e.g., AI agent development blueprints) are defined or configured. By injecting secure defaults and preventative constraints directly into development or deployment workflows, downstream system 212 can operationalize secure coding rules 211 generated by rules generation framework 210, thereby completing the feedback loop between flaw detection and flaw prevention.

In some aspects, contextual information 214 may also be added to graph database 206 to enrich the representation of repositories, reports, and flaws. Such contextual information 214 can include architecture diagrams, dependency graphs, metadata about the programming languages used in the repository, and/or annotations regarding third-party libraries and APIs. For instance, an architecture diagram submitted as contextual information may reveal that multiple services rely on the same authentication module, enabling the graph database 206 to link flaws identified in different services back to a common component. Similarly, dependency metadata may allow the system to distinguish between flaws introduced by a repository's own code and flaws inherited from a third-party dependency. In some embodiments, by incorporating contextual information into graph database 206, system 200 strengthens its ability to identify meaningful correlations and recurring flaw patterns across repositories.

In various embodiments, graph database 206 plays a role in unifying and structuring the outputs of security assessment agent 204. By storing evaluation data 213 as nodes, graph database 206 may enable relationships between repositories, flaws, contextual metadata, and evaluation reports to be explicitly represented and queried. For example, graph database 206 may be queried to identify all repositories impacted by a particular flaw category or to trace the lineage of a flaw back to its originating repository and associated architecture diagram. This graph-based representation can provide flexibility and scalability beyond traditional relational storage, allowing system 200 to reason over relationships and aggregate results dynamically.

In addition to representing flaws and contextual metadata, graph database 206 may store historical evaluation data 207 that can be reused or re-analyzed as threat models evolve. For example, as new secure coding standards are introduced, historical reports stored in graph database 206 may be re-queried to determine whether previously evaluated repositories conform to the updated standards. In another case, historical evaluation data 207 may reveal trends such as the decreasing prevalence of certain flaw categories after corresponding secure coding rules 211 were deployed. This feedback loop enables system 200 to track the effectiveness of its generated rules and to adjust its prioritization strategies over time.

In some implementations, security assessment agent 204 applies multiple types of threat modeling techniques to generate robust evaluation reports/nodes 205. These techniques may include rule-based scanners, machine learning classifiers trained on known vulnerability datasets, or structured frameworks such as the MAESTRO threat modeling framework. Each technique may identify different types of flaws, ranging from simple syntactic issues such as hard-coded credentials to more complex architectural weaknesses such as insecure inter-service communications. By combining the results of multiple techniques, security assessment agent 204 may increase coverage and reduce false negatives. Furthermore, evaluation reports/nodes 205 generated by security assessment agent 204 may include not only detected flaws but also potential remediation steps or recommendations, which can be subsequently incorporated into graph database 206 for use by evaluation results aggregator 208.

In some aspects, system 200 described in FIG. 2 may operate in an iterative fashion, with secure coding rules 211 generated during one development cycle being applied to influence subsequent development and assessment cycles. For example, once a secure coding rule 211 is generated to enforce the use of parameterized queries, subsequent evaluations of repositories may detect fewer instances of insecure string concatenation in database queries. Over time, system 200 can adjust its focus toward other categories of recurring flaws, enabling the rule set to evolve dynamically and address the most pressing vulnerabilities as they emerge. In some cases, system 200 may also incorporate developer feedback or findings from external audits into evaluation results aggregator 208, thereby enriching the set of flaw patterns available for analysis and further improving the quality of the rules produced. By supporting this continuous cycle of detection, rule generation, and re-evaluation, system 200 may promote ongoing improvement of software security practices across diverse projects.

In summary, FIG. 2 illustrates an end-to-end system 200 for security evaluation of code repositories, correlation of results in graph database 206, and generation of secure coding rules 211 for downstream application. Through the interaction of security assessment agent 204, evaluation results aggregator 208, rules generation framework 210, and downstream system 212, system 200 may provide a scalable and automated approach to improving software security across multiple codebases. By unifying evaluation data into a graph structure, normalizing and correlating flaws across repositories, and synthesizing rules that can be directly consumed by development and deployment frameworks, the disclosed techniques may enable organizations to detect recurring flaws, generate actionable remediation guidance, and enforce secure coding practices at scale.

Example Architecture of Security Assessment Agent

Figure 3:
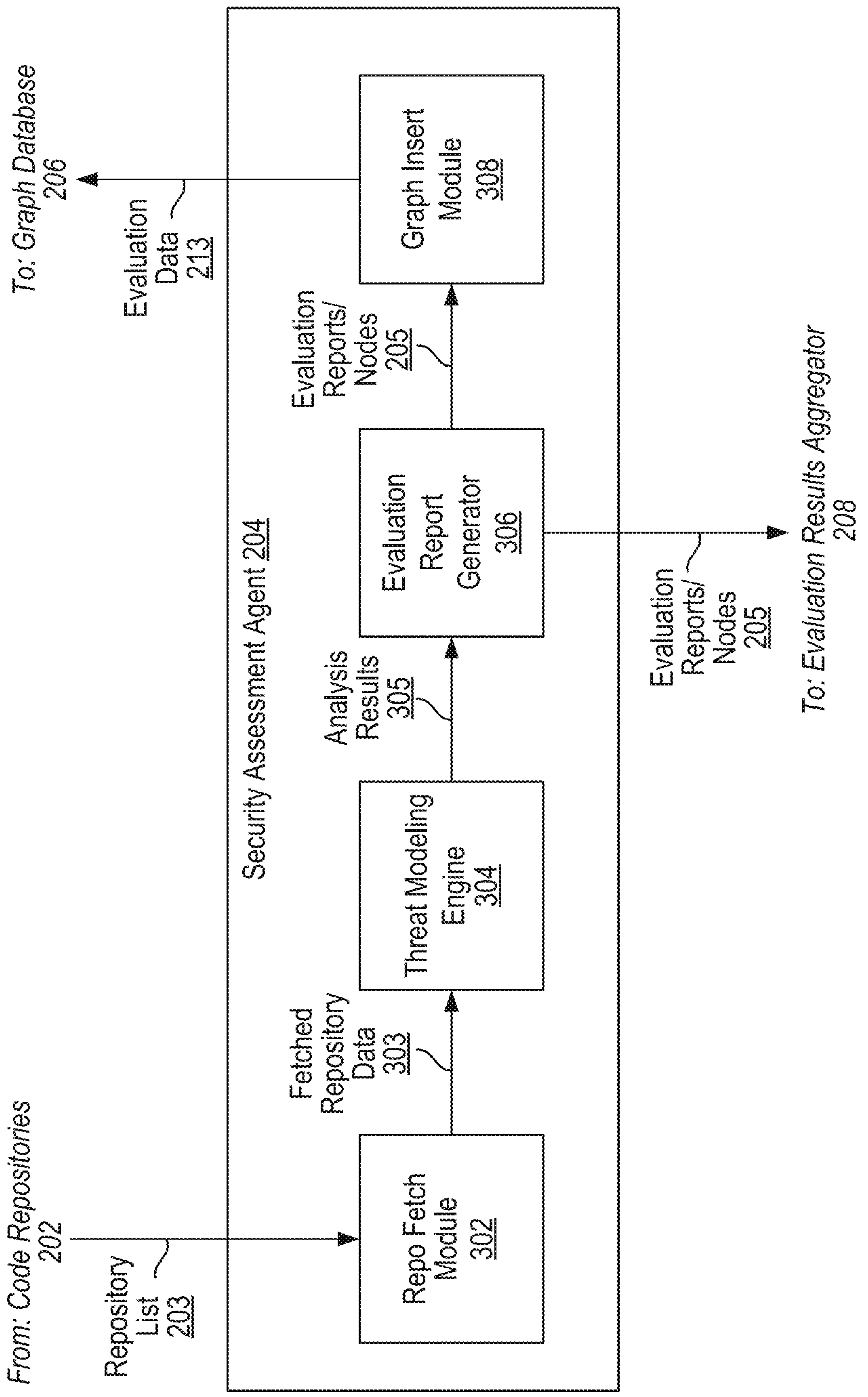
FIG. 3 depicts an example architecture of a security assessment agent.

FIG. 3 depicts one embodiment of an example architecture of security assessment agent 204. As shown, security assessment agent 204 includes components operable to retrieve code repositories, perform threat modeling, generate evaluation reports, and insert structured evaluation data into a graph database (e.g., graph database 206 as depicted in FIG. 2). In the illustrated embodiment depicted in FIG. 3, security assessment agent 204 comprises repository fetch module 302, threat modeling engine 304, evaluation report generator 306, and graph insert module 308. Repository fetch module 302 retrieves source code according to repository list 203 received from code repositories 202 and provides fetched repository data 303 to threat modeling engine 304. Threat modeling engine 304 analyzes the repository data using one or more threat modeling techniques and produces analysis results 305, which are consumed by evaluation report generator 306. The evaluation report generator 306 may generate evaluation reports/nodes 205 describing identified flaws and may output these both to evaluation results aggregator 208 and to graph insert module 308. The graph insert module 308 stores evaluation data 213 in graph database 206, such that the results are in a structured and queryable form.

In some aspects, repository fetch module 302 is operable to receive repository list 203 from code repositories 202 (e.g., as illustrated in FIG. 2). In various embodiments, repository list 203 may identify a plurality of repositories corresponding to different software agents, services, or components. Repository fetch module 302 retrieves the source code and associated artifacts for each repository and produces fetched repository data 303 for downstream analysis. Threat modeling engine 304 receives fetched repository data 303 from repository fetch module 302 and applies one or more threat modeling techniques to detect potential flaws. In some embodiments, threat modeling engine 304 may also reference contextual information such as architecture diagrams or metadata stored in graph database 206 (e.g., as illustrated in FIG. 2) to augment its analysis.

In some cases, threat modeling engine 304 processes fetched repository data 303 and produces analysis results 305 describing identified flaws, risks, or vulnerabilities. In some aspects, threat modeling engine 304 may apply structured frameworks, such as the MAESTRO framework, or other comparable threat modeling approaches to evaluate potential attack surfaces, data flows, or trust boundaries within the code. The analysis results 305 may include descriptive metadata, severity scores, and supporting evidence derived from the codebase. Threat modeling engine 304 passes analysis results 305 to evaluation report generator 306, which formats the results into evaluation reports/nodes 205 (e.g., as illustrated in FIG. 2). The analysis results 305 may include not only flaw descriptions but also metadata supporting potential remediation strategies.

In some aspects, evaluation report generator 306 is operable to transform analysis results 305 into structured evaluation reports/nodes 205. In some embodiments, evaluation report generator 306 may normalize flaw descriptions, attach contextual annotations, and/or classify results according to flaw type, severity, or affected component. Evaluation reports/nodes 205 may be provided in multiple directions.

For example, first they can be transmitted to graph insert module 308 for storage as evaluation data 213 in graph database 206 (e.g., as illustrated in FIG. 2); and second, they may be directly provided to evaluation results aggregator 208 (e.g., as illustrated in FIG. 2) for real-time aggregation across repositories.

Graph insert module 308 may receive evaluation reports/nodes 205 from evaluation report generator 306 and generate corresponding evaluation data 213 for insertion into graph database 206 (e.g., as illustrated in FIG. 2). In some instances, graph database 206 stores nodes that represent repositories, flaws, evaluation reports, and contextual information, thereby preserving the relationships between repositories and their detected flaws. In some aspects, graph insert module 308 may also link evaluation data 213 to contextual information 214 (e.g., as illustrated in FIG. 2), such as architecture diagrams or dependency graphs, to enrich the stored representation.

In various embodiments, evaluation reports/nodes 205 generated by evaluation report generator 306 and stored as evaluation data 213 in graph database 206 may include both flaw details and proposed remediations. For example, if analysis results 305 identify that a repository concatenates un-sanitized user input into database queries, evaluation reports/nodes 205 may not only record the flaw but also suggest parameterized queries as a remediation. By structuring the information in this way, graph database 206 supports both flaw identification and downstream remediation guidance.

In summary, FIG. 3 illustrates the internal architecture of security assessment agent 204 (e.g., as illustrated in FIG. 2). Through the operation of repository fetch module 302, threat modeling engine 304, evaluation report generator 306, and graph insert module 308, the security assessment agent 204 transforms repository list 203 into structured evaluation reports/nodes 205 and evaluation data 213 stored in graph database 206. These structured outputs are then made available to evaluation results aggregator 208 for identifying recurring flaw patterns and common flaw entries, thereby linking individual repository assessments with the downstream processes of aggregation and secure coding rule generation.

Example Architecture of Evaluation Results Aggregator

Figure 4:
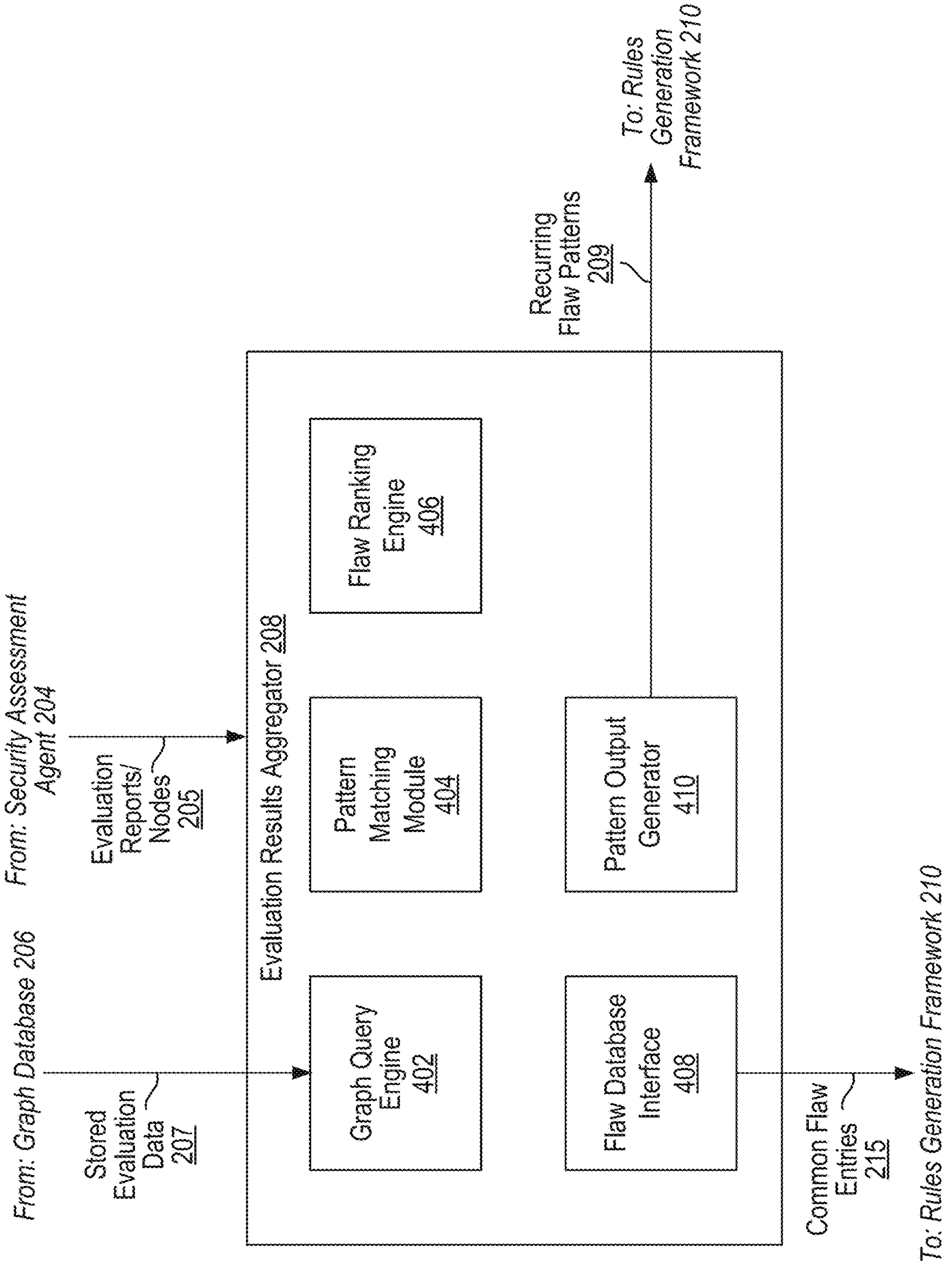
FIG. 4 depicts an example architecture of an evaluation results aggregator.

FIG. 4 depicts one embodiment of an example architecture of evaluation results aggregator 208 (e.g., as illustrated in FIG. 2). The evaluation results aggregator 208 operates as an intermediate layer that consolidates evaluation reports or nodes 205 (e.g., as illustrated in FIG. 2) produced by security assessment agent 204 with stored evaluation data 207 (e.g., as illustrated in FIG. 2) retrieved from graph database 206. As shown, evaluation results aggregator 208 may include graph query engine 402, pattern matching module 404, flaw ranking engine 406, flaw database interface 408, and pattern output generator 410. These components collectively may process evaluation reports/nodes 205 and stored evaluation data 207 to generate recurring flaw patterns 209 and common flaw entries 215, which are provided to rules generation framework 210 (e.g., as illustrated in FIG. 2).

In some aspects, graph query engine 402 is operable to receive stored evaluation data 207 from graph database 206 and perform structured queries over repository nodes, flaw nodes, and contextual information. Graph query engine 402 may identify relationships such as dependencies between services, reuse of vulnerable components, or flaws that propagate across multiple repositories. In parallel, evaluation reports/nodes 205 received from security assessment agent 204 may be normalized and provided to pattern matching module 404, which detects recurring flaw structures across repositories. Pattern matching module 404 may employ techniques such as subgraph isomorphism detection, rule-based pattern templates, or machine learning models trained to identify semantically equivalent flaws expressed using different terminology or structures.

In some examples, flaw ranking engine 406 is configured to prioritize flaws based on frequency, severity, and/or systemic impact. In some embodiments, flaw ranking engine 406 applies scoring heuristics or statistical weighting to elevate vulnerabilities most likely to compromise important functions of a system. For example, flaws related to authentication bypass may be ranked higher than those involving minor input sanitization issues, while flaws that recur across multiple repositories may receive an elevated priority score. By generating normalized rankings, flaw ranking engine 406 may ensure that recurring flaw patterns 209 emphasize vulnerabilities that are both widespread and impactful, improving the downstream generation of secure coding rules 211 (e.g., as illustrated in FIG. 2).

In some aspects, flaw database interface 408 is operable to generate common flaw entries 215 that represent unified versions of flaws detected across different repositories and different assessment methods. For instance, if one repository describes a flaw as "missing authentication checks" and another as "absent identity validation," flaw database interface 408 consolidates these into a single common flaw entry 215. These entries are output to rules generation framework 210 (e.g., as illustrated in FIG. 2), where they serve as standardized artifacts that guide rule synthesis. By maintaining this mapping between diverse flaw descriptions and their normalized representations, flaw database interface 408 reduces duplication and enhances the reliability of aggregated outputs.

In some cases, pattern output generator 410 consolidates recurring flaw patterns 209 and directs them to rules generation framework 210 (e.g., as illustrated in FIG. 2). In some aspects, pattern output generator 410 may transform identified patterns into higher-order representations such as flaw categories, architectural weaknesses, or anti-patterns. For example, pattern output generator 410 may group together flaws involving un-sanitized API inputs across multiple repositories into a single recurring flaw pattern 209. These outputs provide structured inputs for rules generation framework 210, such that the secure coding rules are derived not only from individual flaws but from systemic patterns that recur across the software ecosystem.

In summary, evaluation results aggregator 208 bridges raw security assessment outputs with actionable flaw patterns and normalized entries. Through the coordinated operation of graph query engine 402, pattern matching module 404, flaw ranking engine 406, flaw database interface 408, and pattern output generator 410, system 200 may transform repository-specific evaluation reports/nodes 205 into aggregated and prioritized artifacts. These recurring flaw patterns 209 and common flaw entries 215 can then be consumed by rules generation framework 210 to synthesize secure coding rules that address both individual vulnerabilities and systemic security risks across code repositories.

Example Architecture of Rules Generation Framework

Figure 5:
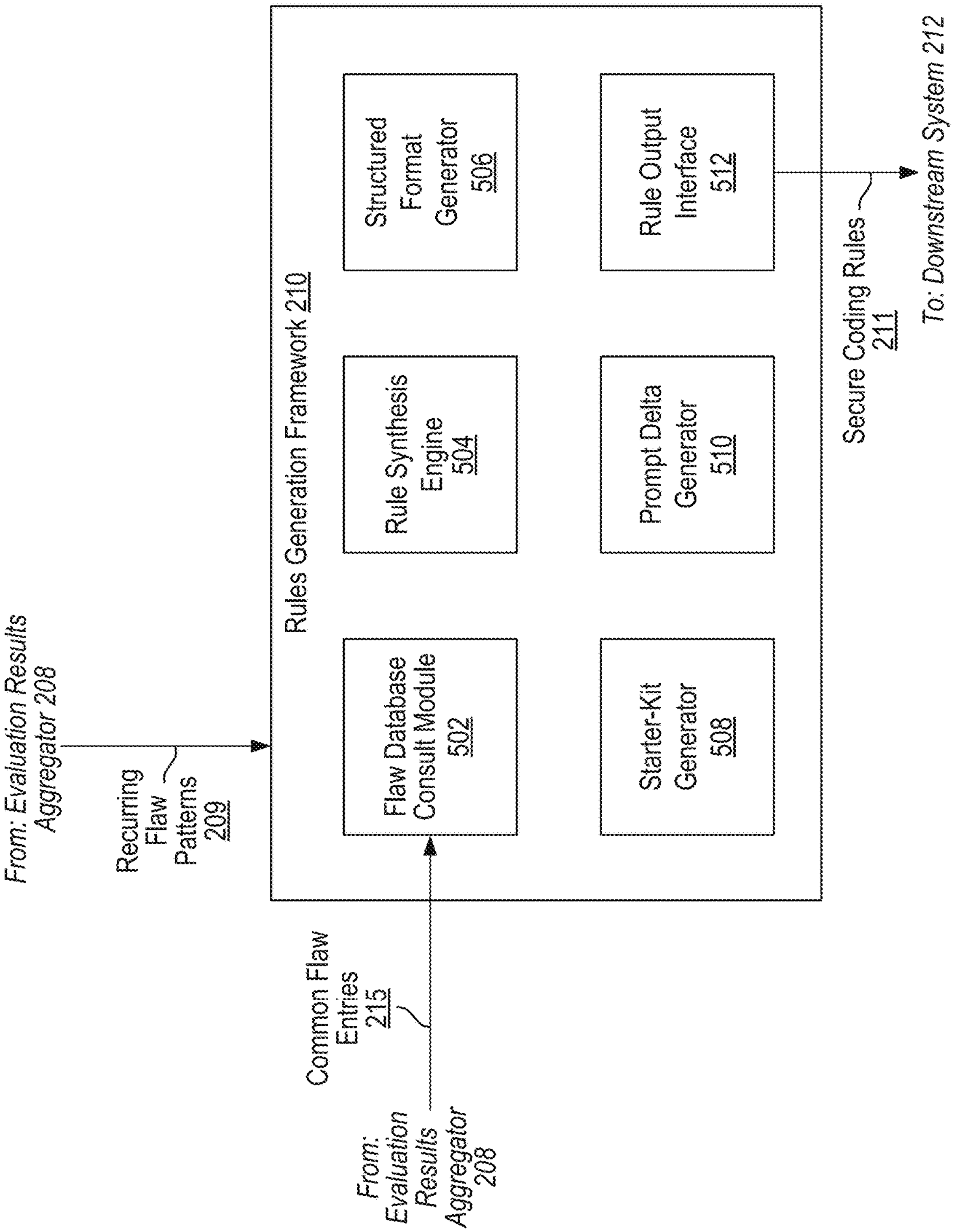
FIG. 5 depicts an example offline training process for an offline training system.

FIG. 5 depicts one embodiment of an example architecture of rules generation framework 210. Rules generation framework 210 is configured to consume recurring flaw patterns 209 and common flaw entries 215 produced by evaluation results aggregator 208 (e.g., as illustrated in FIG. 4) and transform them into actionable secure coding rules 211, which may then be applied by downstream system 212 (e.g., as illustrated in FIG. 2). As depicted, rules generation framework 210 includes flaw database consult module 502, rule synthesis engine 504, structured format generator 506, starter-kit generator 508, prompt delta generator 510, and rule output interface 512. These components enable the translation of aggregated flaw data into machine-readable rules, developer-ready assets, and configuration guidance that can be directly operationalized.

Flaw database consult module 502 may be configured to reference common flaw entries 215 and compare them against external vulnerability databases, internal security guidelines, or organizational best practices. For example, flaw database consult module 502 may map a normalized flaw entry such as "unsanitized database input" to known vulnerability classes stored in the Common Weakness Enumeration (CWE) database, or to previously defined enterprise coding standards. By maintaining this connection between newly observed flaws and well-established security knowledge, flaw database consult module 502 may ensure that the subsequent synthesis of rules is grounded in authoritative references. In some embodiments, flaw database consult module 502 may also flag discrepancies between internal rules and external databases, prompting the generation of rules that bridge these gaps.

In some aspects, rule synthesis engine 504 transforms recurring flaw patterns 209 into actionable secure coding rules. For example, when recurring flaw patterns 209 indicate widespread use of hard-coded API tokens across multiple repositories, rule synthesis engine 504 may generate a rule mandating the use of secure secret storage services (e.g., environment variable injection or hardware security modules). In some aspects, rule synthesis engine 504 uses templates that specify both insecure patterns and their secure counterparts, allowing the rules to capture not only the prohibited practices but also the recommended alternatives. The synthesis engine may additionally assign severity or priority metadata to each rule, such that downstream systems focus remediation efforts on the most impactful vulnerabilities.

Structured format generator 506 may produce secure coding rules in a standardized and/or machine-readable format to ensure compatibility with heterogeneous downstream systems 212. In one embodiment, structured format generator 506 may output rules as JSON, YAML, or XML specifications that can be automatically parsed by integrated development environments (IDEs), code linters, or policy enforcement engines. In another embodiment, structured format generator 506 produces human-readable documentation alongside machine-readable artifacts, which may enable developers to consult descriptive rule guidance during code review. The structured output may include fields such as "rule identifier," "vulnerability class," "severity ranking," "recommended remediation," and "example secure implementations." By supporting both machine and human consumption, structured format generator 506 may ensure that secure coding rules are broadly usable across organizational contexts.

In some examples, starter-kit generator 508 creates developer-ready assets such as reference implementations, boilerplate project files, or template source code that embody secure practices. For instance, in response to recurring flaw patterns 209 identifying improper construction of SQL queries, starter-kit generator 508 may output a secure database access template that demonstrates the correct use of parameterized queries. In another example, for flaws involving weak cryptographic practices, starter-kit generator 508 may produce a starter library configured with strong encryption defaults. These starter-kits can serve as drop-in building blocks that developers can adopt, thereby potentially accelerating the remediation of vulnerabilities and promoting the use of consistent, secure design patterns.

In some aspects, prompt delta generator 510 produces modifications, or "deltas," that adjust the behavior of automated code generation systems or language models. For example, when recurring flaw patterns indicate that automatically generated code often omits authentication steps, prompt delta generator 510 may generate modifications to code-generation prompts that explicitly require inclusion of authentication routines. In another example, prompt delta generator 510 may output constraints or hints that guide generative systems away from insecure practices such as direct string concatenation in file paths. By generating prompt deltas, this component can extend the applicability of secure coding rules to AI-assisted or automated development pipelines, such that future generated code avoids the same vulnerabilities identified in past repositories.

Rule output interface 512 may serve as the delivery mechanism for secure coding rules 211 to downstream system 212 (e.g., as illustrated in FIG. 2). In some embodiments, rule output interface 512 supports multiple channels of distribution, including APIs, file exports, or direct integration with developer tools. For instance, secure coding rules 211 may be automatically pushed to a continuous integration/continuous deployment (CI/CD) pipeline, loaded into an IDE as linting rules, or distributed as configuration policies for blueprint management systems. Rule output interface 512 may also track delivery confirmations or usage metrics, enabling feedback loops where downstream adoption of rules can be monitored and reported back into the system.

In summary, rules generation framework 210 provides the mechanisms for transforming aggregated flaw data into actionable secure coding rules 211. Through the combined operation of flaw database consult module 502, rule synthesis engine 504, structured format generator 506, starter-kit generator 508, prompt delta generator 510, and rule output interface 512, system 200 may enable both automated enforcement and developer-friendly adoption of secure practices. By bridging the gap between raw flaw patterns and operationalized rules, rules generation framework 210 may ensure that vulnerabilities identified in code repositories are translated into consistent, scalable, and enforceable guidance that strengthens the security posture of agentic codebases.

Example Method for Providing Secure Coding Rules

Figure 6:
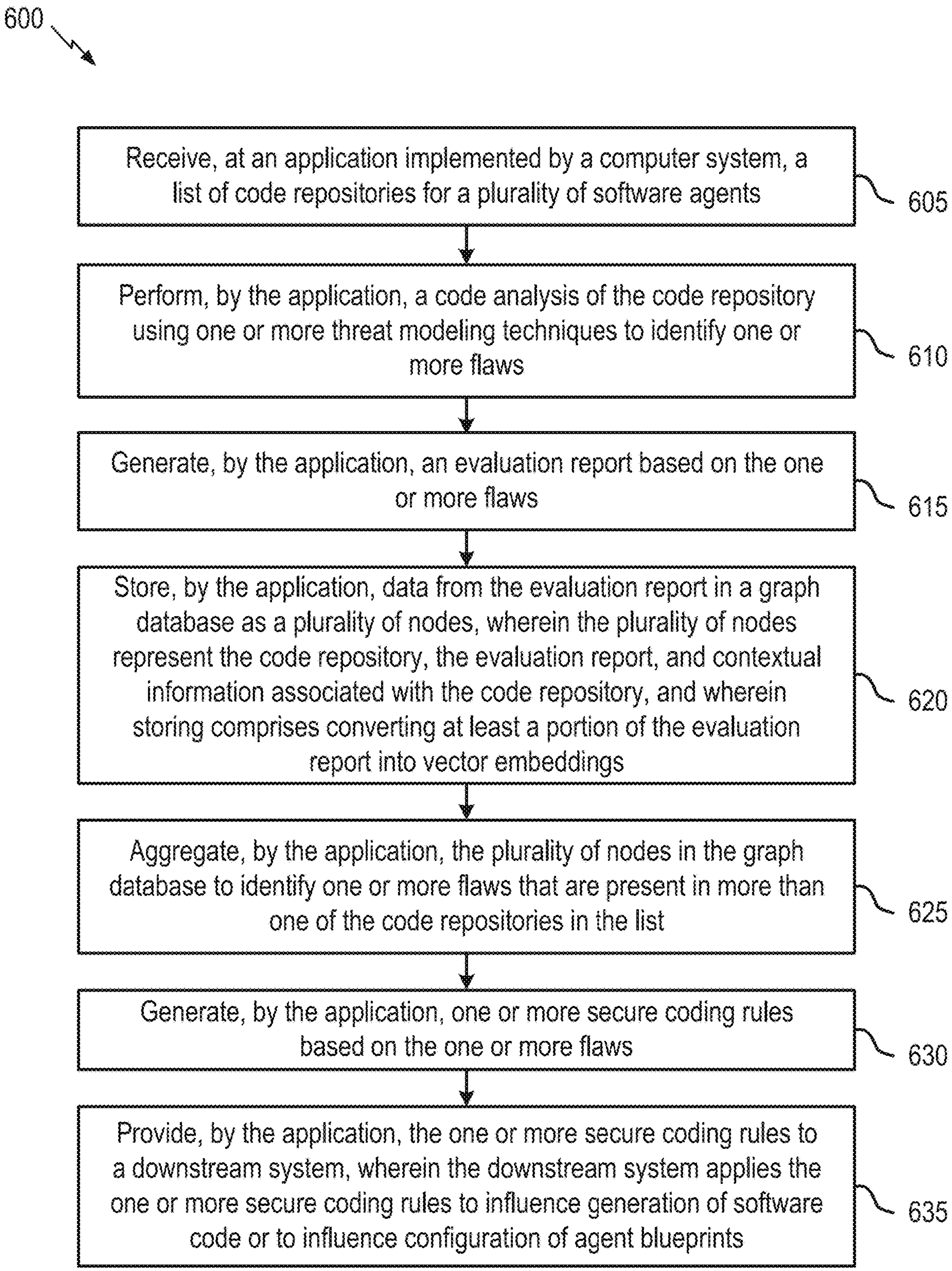
FIG. 6 depicts an example flow diagram of a method for providing secure coding rules.

FIG. 6 depicts an example method 600 for providing secure coding rules. In one aspect, method 600 can be implemented by the system 200 of FIG. 2 and/or processing system 800 of FIG. 8.

Method 600 begins at block 605 with receiving, at an application implemented by a computer system, a list of code repositories for a plurality of software agents. For example, repository list 203 (e.g., as illustrated in FIG. 2) may be provided from code repositories 202 to security assessment agent 204. Repository list 203 can identify multiple repositories corresponding to different agents, services, or components, each of which may subsequently undergo security evaluation.

In some aspects, blocks 610-620 are performed for each code repository in the list received at block 605.

Method 600 then proceeds to block 610 with performing, by the application, a code analysis of the code repository using one or more threat modeling techniques to identify one or more flaws. For example, security assessment agent 204 (e.g., as illustrated in FIG. 2) may employ threat modeling engine 304 of FIG. 3 to process fetched repository data 303 and detect flaws such as missing authentication checks, insecure prompt handling, or improper API usage. The analysis may apply structured frameworks, such as the MAESTRO threat modeling framework, or other comparable approaches to reason about potential attack surfaces, trust boundaries, and failure points.

Method 600 then proceeds to block 615 with generating, by the application, an evaluation report based on the one or more flaws. For example, evaluation report generator 306 of FIG. 3 may transform analysis results 305 into evaluation reports/nodes 205 that describe the identified flaws, supporting evidence, and potential remediation steps. These reports may be provided both to evaluation results aggregator 208 (e.g., as illustrated in FIG. 2) for aggregation across repositories and to graph insert module 308 of FIG. 3 for storage in graph database 206.

Method 600 then proceeds to block 620 with storing, by the application, data from the evaluation report in a graph database as a plurality of nodes, wherein the plurality of nodes represent the code repository, the evaluation report, and contextual information associated with the code repository, and wherein storing comprises converting at least a portion of the evaluation report into vector embeddings. For example, graph insert module 308 of FIG. 3 may store evaluation data 213 in graph database 206, linking repository nodes, flaw nodes, and contextual information 214 such as architecture diagrams or dependency metadata. In some cases, embeddings generated from portions of evaluation reports 205 may be stored alongside structural graph representations, thereby enabling similarity-based retrieval and semantic reasoning over past evaluations.

Method 600 then proceeds to block 625 with aggregating, by the application, the plurality of nodes in the graph database to identify one or more flaws that are present in more than one of the code repositories in the list. For example, evaluation results aggregator 208 (e.g., as illustrated in FIG. 2) may query stored evaluation data 207 in graph database 206 using graph query engine 402 of FIG. 4, normalize the outputs into common flaw entries 215 via flaw database interface 408, and detect recurring flaw patterns 209 using pattern matching module 404. This aggregation may reveal systemic issues, such as repeated improper handling of API authentication across multiple repositories, that are not apparent from analyzing a single repository in isolation.

Method 600 then proceeds to block 630 with generating, by the application, one or more secure coding rules based on the one or more flaws. For example, rules generation framework 210 (e.g., as illustrated in FIG. 2) may use rule synthesis engine 504 of FIG. 5 to transform recurring flaw patterns 209 into secure coding rules 211. These rules may specify prohibited constructs (e.g., unsanitized string concatenation in SQL queries) and their corresponding secure alternatives (e.g., parameterized queries) and may be output in standardized machine-readable formats via structured format generator 506 to ensure compatibility with downstream systems.

Method 600 then proceeds to block 635 with providing, by the application, the one or more secure coding rules to a downstream system, wherein the downstream system applies the one or more secure coding rules to influence generation of software code or to influence configuration of agent blueprints. For example, rule output interface 512 of FIG. 5 may deliver secure coding rules 211 to downstream system 212 (e.g., as illustrated in FIG. 2), which may include an integrated development environment (IDE) or blueprint management system. The downstream system 212 may enforce the rules during code generation, highlight violations in real time, or configure software agent templates with secure defaults, thereby operationalizing the rules in active development workflows.

In some aspects, block 610 includes applying a threat modeling framework to the code repository. For example, threat modeling engine 304 of FIG. 3 may implement structured frameworks to evaluate attack surfaces, data flows, and trust boundaries during analysis of fetched repository data 303.

In some aspects, the threat modeling framework comprises the MAESTRO threat modeling framework. For example, threat modeling engine 304 may apply MAESTRO to reason about agent goals, assets, and potential attack paths within the code repository, thereby generating analysis results 305 enriched with structured threat vectors.

In some aspects, the plurality of nodes further represent the one or more flaws and one or more code improvements identified in the evaluation report. For example, graph insert module 308 of FIG. 3 may store nodes in graph database 206 that represent both flaw descriptions and remediation suggestions, enabling downstream correlation between flaws and their candidate fixes.

In some aspects, the plurality of nodes in the graph database are connected by edges that link one or more flaws to one or more corresponding code improvements or to the one or more secure coding rules. For example, graph database 206 may create relationships between a flaw node, a suggested remediation node, and the secure coding rule 211 generated in FIG. 5, thereby supporting traceability from detection to prevention.

In some aspects, the contextual information comprises an architecture diagram associated with the code repository. For example, contextual information 214 of FIG. 2 may include diagrams that map service dependencies, authentication flows, or data storage layers, which can be linked to flaws stored in graph database 206.

In some aspects, the architecture diagram is processed using an image recognition model to extract one or more features for inclusion in the graph database. For example, evaluation report generator 306 may employ an image recognition model to parse diagrammatic elements such as nodes and edges, storing the extracted features as part of evaluation data 213.

In some aspects, block 630 includes expressing the one or more secure coding rules in a structured format organized by programming language. For example, structured format generator 506 of FIG. 5 may output JSON or YAML rule specifications categorized for Java, Python, or JavaScript, ensuring compatibility with language-specific developer tools.

In some aspects, the one or more secure coding rules comprise a starter-kit patch including one or more secure template source files. For example, starter-kit generator 508 of FIG. 5 may output boilerplate code for secure API request handling or database access templates that developers can directly adopt.

In some aspects, the one or more secure coding rules comprise one or more prompt modifications for a language model used to generate code. For example, prompt delta generator 510 of FIG. 5 may generate prompt adjustments that explicitly require authentication routines or disallow unsafe string concatenation in AI-assisted code generation workflow.

In some aspects, the one or more flaws comprise at least one of a code-level vulnerability, a configuration-level vulnerability, an architectural weakness associated with an agent workflow, or a combination thereof. For example, evaluation report generator 306 may record code-level issues such as hardcoded credentials, configuration-level issues such as weak timeout settings, and workflow-level weaknesses such as missing authentication in agent orchestration flows, each represented as nodes in graph database 206.

In summary, method 600 provides a technical solution to the challenges of detecting, correlating, and remediating flaws across large and diverse code repositories. By combining repository-specific threat modeling, structured representation of flaws and contextual information in a graph database, and aggregation of recurring patterns across repositories, method 600 enables a computer system to perform security evaluations that would be impractical to execute manually. The method transforms raw code analysis outputs into normalized nodes, links flaws to remediations, and integrates contextual features such as architecture diagrams, thereby improving the ability of computing systems to reason over vulnerabilities at scale. In some embodiments, the graph database may function as a multimodal knowledge base constructed from code analysis reports, asset topologies, product specifications, and architecture diagrams. This structure enables hierarchical clustering and cross-modal linkage of related information, resulting in higher-precision flaw classification and improved understanding of system-wide dependencies. Further, by generating and providing secure coding rules in structured, machine-readable formats to downstream systems, method 600 closes the loop between flaw detection and flaw prevention. These improvements reduce computational overhead, accelerate rule deployment, and directly enhance the reliability, security, and responsiveness of the computing environments in which the disclosed techniques are applied.

Note that FIG. 6 is just one example of a method, and other methods including fewer, additional, or alternative operations are possible consistent with this disclosure.

Example Method for Outputting Secure Coding Rules

Figure 7:
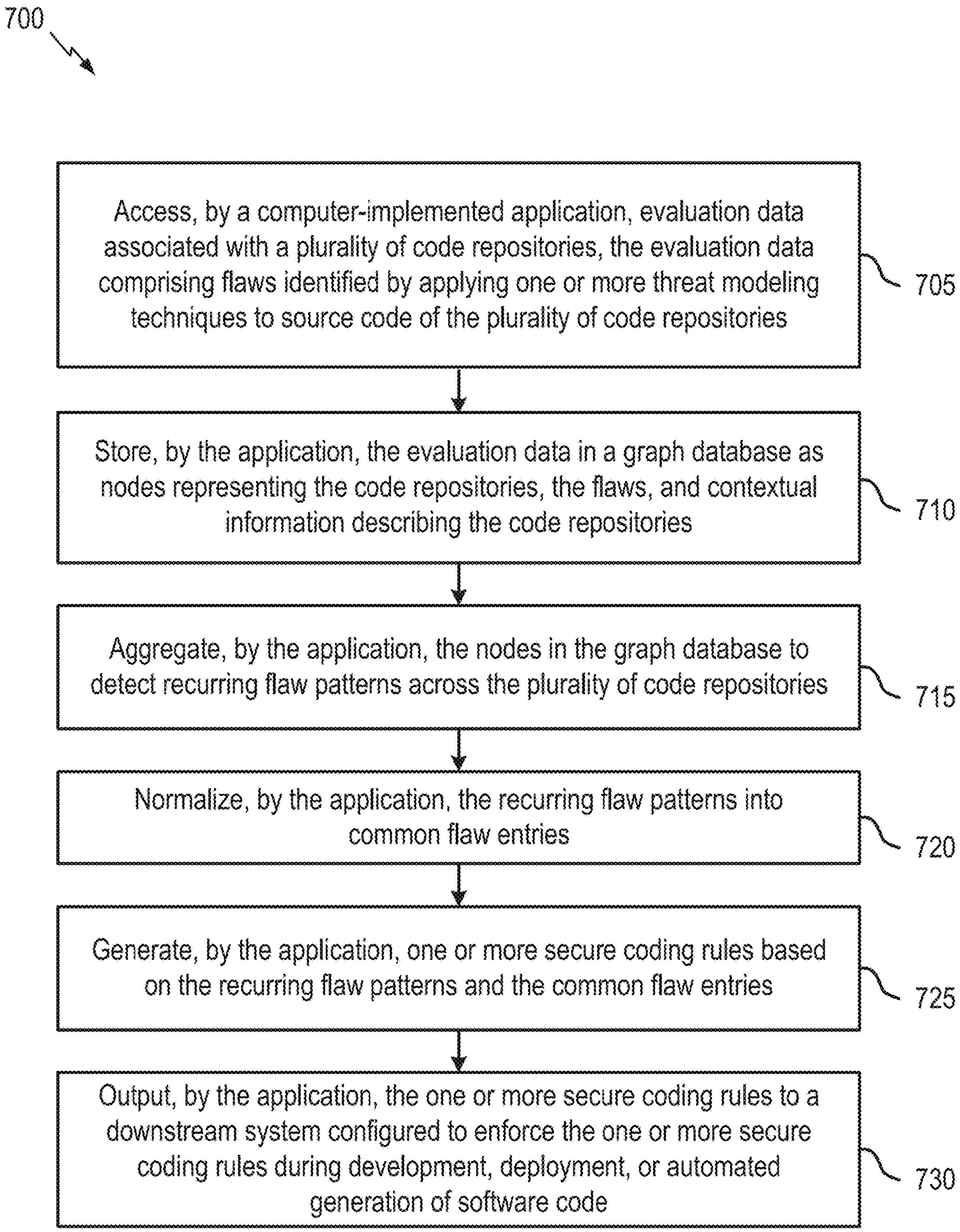
FIG. 7 depicts an example flow diagram of a method for outputting secure coding rules.

FIG. 7 depicts an example method 700 for outputting secure coding rules. In one aspect, method 700 can be implemented by the system 200 of FIG. 2 and/or processing system 800 of FIG. 8.

Method 700 begins at block 705 with accessing, by a computer-implemented application, evaluation data associated with a plurality of code repositories, the evaluation data comprising flaws identified by applying one or more threat modeling techniques to source code of the plurality of code repositories. For example, the application may retrieve evaluation reports/nodes 205 previously generated by security assessment agent 204 and stored as evaluation data 213 in graph database 206 (e.g., as illustrated in FIG. 2).

Method 700 then proceeds to block 710 with storing, by the application, the evaluation data in a graph database as nodes representing the code repositories, the flaws, and contextual information describing the code repositories. For example, flaws identified in a payment service repository may be stored as flaw nodes linked to contextual information 214 such as an architecture diagram, thereby preserving relationships between system components and detected vulnerabilities.

Method 700 then proceeds to block 715 with aggregating, by the application, the nodes in the graph database to detect recurring flaw patterns across the plurality of code repositories. For example, evaluation results aggregator 208 may identify that multiple repositories reference un-sanitized API calls or insecure prompt handling, and group these into recurring flaw patterns 209.

Method 700 then proceeds to block 720 with normalizing, by the application, the recurring flaw patterns into common flaw entries. For example, flaw database interface 408 may consolidate differently worded vulnerabilities, such as "missing authentication check" and "absent user identity validation," into a unified common flaw entry 215.

Method 700 then proceeds to block 725 with generating, by the application, one or more secure coding rules based on the recurring flaw patterns and the common flaw entries. For example, rules generation framework 210 may synthesize a rule requiring use of parameterized database queries when recurring flaw patterns indicate repeated use of insecure string concatenation in SQL statements.

Method 700 then proceeds to block 730 with outputting, by the application, the one or more secure coding rules to a downstream system configured to enforce the one or more secure coding rules during development, deployment, or automated generation of software code. For example, downstream system 212 may comprise an IDE, CI/CD pipeline, or blueprint management system that automatically applies the generated secure coding rules 211 to influence code review, deployment, or automated code generation.

In summary, method 700 provides a technical solution that transforms repository-specific flaw analysis into aggregated, normalized, and enforceable secure coding rules. By representing evaluation data as nodes in a graph database, aggregating and normalizing recurring flaw patterns, and synthesizing machine-readable rules, method 700 enables computing systems to automate the transition from flaw detection to flaw prevention. This integration directly improves computer functionality by reducing redundant remediation effort, standardizing flaw handling across heterogeneous repositories, and enabling downstream systems to enforce secure practices in real time. As a result, method 700 enhances the reliability, security, and scalability of development and deployment pipelines, addressing the technical problems of fragmented security analysis and inconsistent enforcement in distributed software environments.

Note that FIG. 7 is just one example of a method, and other methods including fewer, additional, or alternative operations are possible consistent with this disclosure.

Example Processing System for Secure Coding Rules

Figure 8:
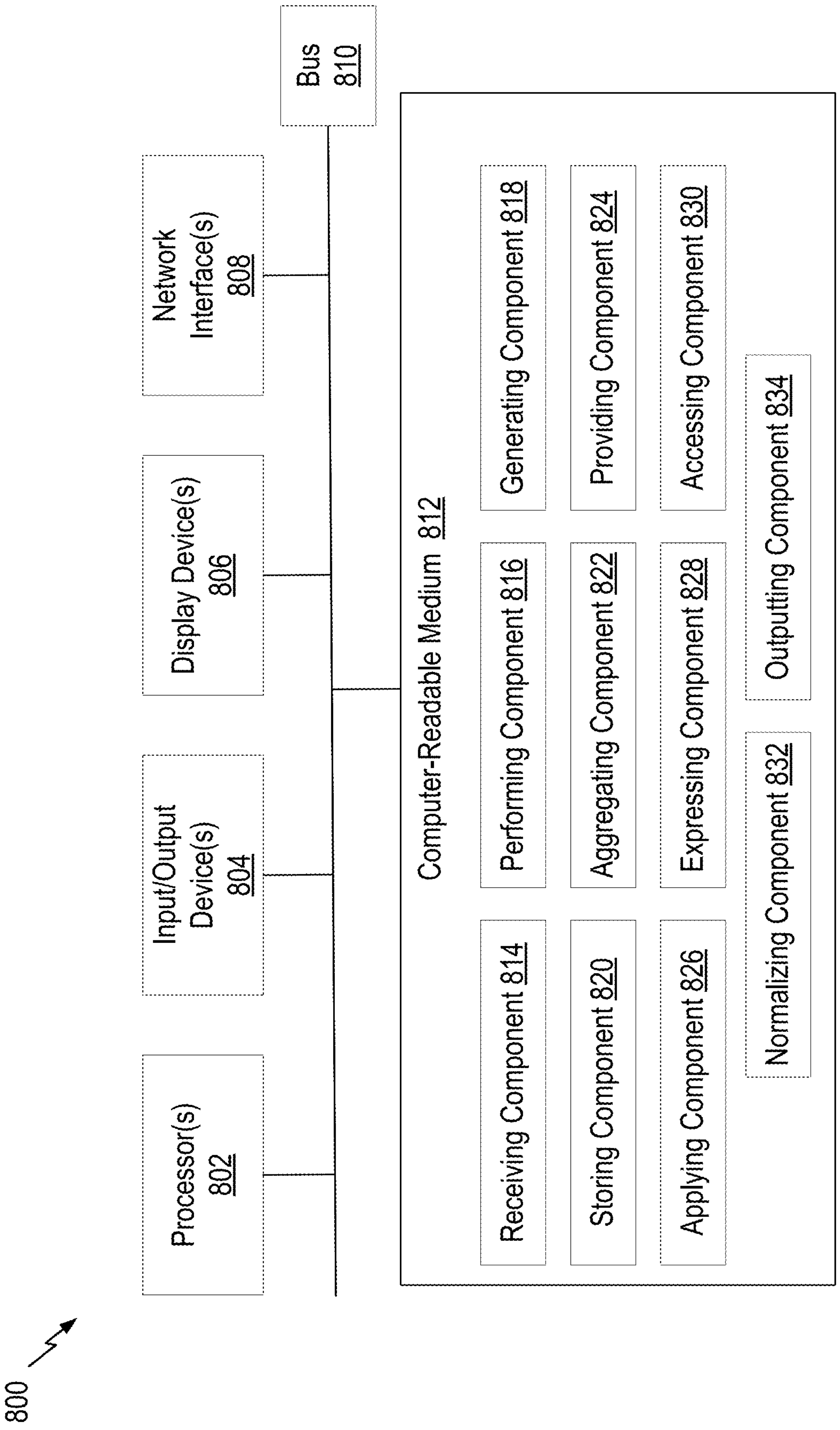
FIG. 8 depicts an example processing system with which aspects of the present disclosure can be performed.

FIG. 8 depicts an example processing system 800 configured to perform various aspects described herein, including, for example, method 600 and 700 as described above with respect to FIG. 6 and FIG. 7.

Processing system 800 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 800 includes one or more processors 802, one or more input/output devices 804, one or more display devices 806, one or more network interfaces 808 through which processing system 800 is connected to one or more networks (e.g., a local network, an intranet, the Internet, or any other group of processing systems communicatively connected to each other), and computer-readable medium 812. In the depicted example, the aforementioned components are coupled by a bus 810, which may generally be configured for data exchange amongst the components. Bus 810 may be representative of multiple buses, while only one is depicted for simplicity.

Processor(s) 802 are generally configured to retrieve and execute instructions stored in one or more memories, including local memories like computer-readable medium 812, as well as remote memories and data stores. Similarly, processor(s) 802 are configured to store application data residing in local memories like the computer-readable medium 812, as well as remote memories and data stores. More generally, bus 810 is configured to transmit programming instructions and application data among the processor(s) 802, display device(s) 806, network interface(s) 808, and/or computer-readable medium 812. In certain embodiments, processor(s) 802 are representative of a one or more central processing units (CPUs), graphics processing unit (GPUs), tensor processing unit (TPUs), accelerators, and other processing devices.

Input/output device(s) 804 may include any device, mechanism, system, interactive display, and/or various other hardware and software components for communicating information between processing system 800 and a user of processing system 800. For example, input/output device(s) 804 may include input hardware, such as a keyboard, touch screen, button, microphone, speaker, and/or other device for receiving inputs from the user and sending outputs to the user.

Display device(s) 806 may generally include any sort of device configured to display data, information, graphics, user interface elements, and the like to a user. For example, display device(s) 806 may include internal and external displays such as an internal display of a tablet computer or an external display for a server computer or a projector. Display device(s) 806 may further include displays for devices, such as augmented, virtual, and/or extended reality devices. In various embodiments, display device(s) 806 may be configured to display a graphical user interface.

Network interface(s) 808 provide processing system 800 with access to external networks and thereby to external processing systems. Network interface(s) 808 can generally be any hardware and/or software capable of transmitting and/or receiving data via a wired or wireless network connection. Accordingly, network interface(s) 808 can include a communication transceiver for sending and/or receiving any wired and/or wireless communication.

Computer-readable medium 812 may be a volatile memory, such as a random access memory (RAM), or a nonvolatile memory, such as nonvolatile random access memory (NVRAM), or the like. In this example, computer-readable medium 812 includes receiving component 814, performing component 816, generating component 818, storing component 820, aggregating component 822, providing component 824, applying component 826, expressing component 828, accessing component 830, normalizing component 832, and outputting component 834.

In certain embodiments, receiving component 814 is configured to receive, at an application implemented by a computer system, a list of code repositories for a plurality of software agents, as described above with reference to block 605 of FIG. 6. In certain embodiments, performing component 816 is configured to perform, by the application, a code analysis of the code repository using one or more threat modeling techniques to identify one or more flaws, as described above with reference to block 610 of FIG. 6. In certain embodiments, generating component 818 is configured to generate, by the application, an evaluation report based on the one or more flaws, as described above with reference to block 615 of FIG. 6. In certain embodiments, storing component 820 is configured to store, by the application, data from the evaluation report in a graph database as a plurality of nodes, wherein the plurality of nodes represent the code repository, the evaluation report, and contextual information associated with the code repository, and wherein storing comprises converting at least a portion of the evaluation report into vector embeddings, as described above with reference to block 620 of FIG. 6. In certain embodiments, aggregating component 822 is configured to aggregate, by the application, the plurality of nodes in the graph database to identify one or more flaws that are present in more than one of the code repositories in the list, as described above with reference to block 625 of FIG. 6. In certain embodiments, generating component 818 is configured to generate, by the application, one or more secure coding rules based on the one or more flaws, as described above with reference to block 630 of FIG. 6. In certain embodiments, providing component 824 is configured to provide, by the application, the one or more secure coding rules to a downstream system, wherein the downstream system applies the one or more secure coding rules to influence generation of software code or to influence configuration of agent blueprints, as described above with reference to block 635 of FIG. 6.

In certain embodiments, accessing component 830 is configured to access, by a computer-implemented application, evaluation data associated with a plurality of code repositories, the evaluation data comprising flaws identified by applying one or more threat modeling techniques to source code of the plurality of code repositories, as described above with reference to block 705 of FIG. 7. In certain embodiments, storing component 820 is configured to store, by the application, the evaluation data in a graph database as nodes representing the code repositories, the flaws, and contextual information describing the code repositories, as described above with reference to block 710 of FIG. 7. In certain embodiments, aggregating component 822 is configured to aggregate, by the application, the nodes in the graph database to detect recurring flaw patterns across the plurality of code repositories, as described above with reference to block 715 of FIG. 7. In certain embodiments, normalizing component 832 is configured to normalize, by the application, the recurring flaw patterns into common flaw entries, as described above with reference to block 720 of FIG. 7. In certain embodiments, generating component 818 is configured to generate, by the application, one or more secure coding rules based on the recurring flaw patterns and the common flaw entries, as described above with reference to block 725 of FIG. 7. In certain embodiments, outputting component 834 is configured to output, by the application, the one or more secure coding rules to a downstream system configured to enforce the one or more secure coding rules during development, deployment, or automated generation of software code, as described above with reference to block 730 of FIG. 7.

Note that FIG. 8 is just one example of a processing system consistent with aspects described herein, and other processing systems having additional, alternative, or fewer components are possible consistent with this disclosure.

Example Clauses

Implementation examples are described in the following numbered clauses:

Clause 1: A method, comprising: receiving, at an application implemented by a computer system, a list of code repositories for a plurality of software agents; for each code repository in the list: performing, by the application, a code analysis of the code repository using one or more threat modeling techniques to identify one or more flaws; generating, by the application, an evaluation report based on the one or more flaws; and storing, by the application, data from the evaluation report in a graph database as a plurality of nodes, wherein the plurality of nodes represent the code repository, the evaluation report, and contextual information associated with the code repository, and wherein storing comprises converting at least a portion of the evaluation report into vector embeddings; aggregating, by the application, the plurality of nodes in the graph database to identify one or more flaws that are present in more than one of the code repositories in the list; generating, by the application, one or more secure coding rules based on the one or more flaws; and providing, by the application, the one or more secure coding rules to a downstream system, wherein the downstream system applies the one or more secure coding rules to influence generation of software code or to influence configuration of agent blueprints.

Clause 2: The method of Clause 1, wherein performing the code analysis comprises applying a threat modeling framework to the code repository.

Clause 3: The method of Clause 2, wherein the threat modeling framework comprises the MAESTRO threat modeling framework.

Clause 4: The method of any one of Clauses 1-3, wherein the plurality of nodes further represent the one or more flaws and one or more code improvements identified in the evaluation report.

Clause 5: The method of any one of Clauses 1-4, wherein the plurality of nodes in the graph database are connected by edges that link one or more flaws to one or more corresponding code improvements or to the one or more secure coding rules.

Clause 6: The method of any one of Clauses 1-5, wherein the contextual information comprises an architecture diagram associated with the code repository.

Clause 7: The method of Clause 6, wherein the architecture diagram is processed using an image recognition model to extract one or more features for inclusion in the graph database.

Clause 8: The method of any one of Clauses 1-7, wherein generating the one or more secure coding rules comprises expressing the one or more secure coding rules in a structured format organized by programming language.

Clause 9: The method of any one of Clauses 1-8, wherein the one or more secure coding rules comprise a starter-kit patch including one or more secure template source files.

Clause 10: The method of any one of Clauses 1-9, wherein the one or more secure coding rules comprise one or more prompt modifications for a language model used to generate code.

Clause 11: The method of any one of Clauses 1-10, wherein the one or more flaws comprise at least one of a code-level vulnerability, a configuration-level vulnerability, an architectural weakness associated with an agent workflow, or a combination thereof.

Clause 12: A method, comprising: accessing, by a computer-implemented application, evaluation data associated with a plurality of code repositories, the evaluation data comprising flaws identified by applying one or more threat modeling techniques to source code of the plurality of code repositories; storing, by the application, the evaluation data in a graph database as nodes representing the code repositories, the flaws, and contextual information describing the code repositories; aggregating, by the application, the nodes in the graph database to detect recurring flaw patterns across the plurality of code repositories; normalizing, by the application, the recurring flaw patterns into common flaw entries; generating, by the application, one or more secure coding rules based on the recurring flaw patterns and the common flaw entries; and outputting, by the application, the one or more secure coding rules to a downstream system configured to enforce the one or more secure coding rules during development, deployment, or automated generation of software code.

Clause 13: An apparatus, comprising a processing system that includes one or more processors and one or more memories coupled with the one or more processors, the processing system configured to: perform a method in accordance with any one of Clauses 1-12.

Clause 14: A processing system, comprising means for performing a method in accordance with any one of Clauses 1-12.

Clause 15: A non-transitory computer-readable medium storing program code for causing a processing system to perform the steps of any one of Clauses 1-12.

Clause 16: A computer program product embodied on a computer-readable storage medium comprising code for performing a method in accordance with any one of Clauses 1-12.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or component(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:

receiving, at an application implemented by a computer system, a list of code repositories for a plurality of software agents;

for each respective code repository in the list:

performing, by the application, a code analysis of the respective code repository using one or more threat modeling techniques to identify one or more flaws;

generating, by the application, an evaluation report based on the one or more flaws; and storing, by the application, data from the evaluation report in a graph database as a plurality of nodes, wherein:

the plurality of nodes represent the respective code repository, the evaluation report, and contextual information associated with the respective code repository, the plurality of nodes are connected by edges that link the one or more flaws to at least one or more corresponding code improvements or one or more secure coding rules, and storing comprises converting at least a portion of the evaluation report into vector embeddings;

aggregating, by the application, the plurality of nodes in the graph database to identify one or more flaws that are present in more than one of the code repositories in the list;

generating, by the application, one or more secure coding rules based on the one or more flaws; and providing, by the application, the one or more secure coding rules to a downstream system, wherein the downstream system comprises a blueprint management system and is configured to apply the one or more secure coding rules to influence configuration of agent blueprints.

2. The method of claim 1, wherein performing the code analysis comprises applying a threat modeling framework to the respective code repository.

3. The method of claim 2, wherein the threat modeling framework comprises a Multi-Agent Environment, Security, Threat, Risk, and Outcome (MAESTRO) threat modeling framework.

4. The method of claim 1, wherein the plurality of nodes further represent the one or more flaws and one or more code improvements identified in the evaluation report.

5. The method of claim 1, wherein the contextual information comprises an architecture diagram associated with the respective code repository.

6. The method of claim 5, wherein the architecture diagram is processed using an image recognition model to extract one or more features for inclusion in the graph database.

7. The method of claim 1, wherein generating the one or more secure coding rules comprises expressing the one or more secure coding rules in a structured format organized by programming language.

8. The method of claim 1, wherein the one or more secure coding rules comprise a starter-kit patch including one or more secure template source files.

9. The method of claim 1, wherein the one or more secure coding rules comprise one or more prompt modifications for a language model used to generate code.

10. The method of claim 1, wherein the one or more flaws comprise at least one of a code-level vulnerability, a configuration-level vulnerability, an architectural weakness associated with an agent workflow, or a combination thereof.

11. A processing system, comprising:

one or more memories comprising computer-executable instructions; and one or more processors configured to execute the computer-executable instructions and cause the processing system to:

receive, at an application implemented by a computer system, a list of code repositories for a plurality of software agents;

for each respective code repository in the list:

perform, by the application, a code analysis of the respective code repository using one or more threat modeling techniques to identify one or more flaws;

generate, by the application, an evaluation report based on the one or more flaws; and store, by the application, data from the evaluation report in a graph database as a plurality of nodes, wherein;

the plurality of nodes represent the respective code repository, the evaluation report, and contextual information associated with the respective code repository, the plurality of nodes are connected by edges that link the one or more flaws to at least one or more corresponding code improvements or one or more secure coding rules, and storing comprises converting at least a portion of the evaluation report into vector embeddings;

aggregate, by the application, the plurality of nodes in the graph database to identify one or more flaws that are present in more than one of the code repositories in the list;

generate, by the application, one or more secure coding rules based on the one or more flaws; and provide, by the application, the one or more secure coding rules to a downstream system, wherein the downstream system comprises a blueprint management system and is configured to apply the one or more secure coding rules to influence configuration of agent blueprints.

12. The processing system of claim 11, wherein performing the code analysis comprises applying a threat modeling framework to the respective code repository.

13. The processing system of claim 12, wherein the threat modeling framework comprises a Multi-Agent Environment, Security, Threat, Risk, and Outcome (MAESTRO) threat modeling framework.

14. The processing system of claim 11, wherein the plurality of nodes further represent the one or more flaws and one or more code improvements identified in the evaluation report.

15. The processing system of claim 11, wherein the contextual information comprises an architecture diagram associated with the respective code repository.

16. The processing system of claim 15, wherein the architecture diagram is processed using an image recognition model to extract one or more features for inclusion in the graph database.

17. The processing system of claim 11, wherein generating the one or more secure coding rules comprises expressing the one or more secure coding rules in a structured format organized by programming language.

18. A method, comprising:

accessing, by a computer-implemented application, evaluation data associated with a plurality of code repositories, the evaluation data comprising flaws identified by applying one or more threat modeling techniques to source code of the plurality of code repositories;

storing, by the computer-implemented application, the evaluation data in a graph database as nodes representing the code repositories, the flaws, and contextual information describing the code repositories, wherein the nodes are connected by edges that link the flaws to one or more secure coding rules;

aggregating, by the computer-implemented application, the nodes in the graph database to detect recurring flaw patterns across the plurality of code repositories;

normalizing, by the computer-implemented application, the recurring flaw patterns into common flaw entries;

generating, by the computer-implemented application, one or more secure coding rules based on the recurring flaw patterns and the common flaw entries; and outputting, by the computer-implemented application, the one or more secure coding rules to a downstream system, wherein the downstream system comprises a blueprint management system configured to influence configuration of agent blueprints.

19. The method of claim 1, wherein:

aggregating, by the application, the nodes in the graph database to detect one or more flaws comprises aggregating, by the application, the nodes in the graph database to detect recurring flaw patterns across the list of code repositories, the method further comprises normalizing, by the application, the recurring flaw patterns into common flaw entries, and generating, by the application, the one or more secure coding rules based on the one or more flaws comprises generating, by the application, the one or more secure coding rules based on the recurring flaw patterns and the common flaw entries.

20. The method of claim 1, wherein the one or more secure coding rules comprise one or more configuration policies for use by the blueprint management system.

* * * * *